United States Patent
Poudyal et al.

(10) Patent No.: US 10,643,668 B1
(45) Date of Patent: May 5, 2020

(54) POWER LOSS DATA BLOCK MARKING

(71) Applicant: Seagate Technology LLC, Cupertino, CA (US)

(72) Inventors: Sundar Poudyal, Boulder, CO (US); Ajay Narayan Kulkarni, Longmont, CO (US); Daniel Kiser, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1463 days.

(21) Appl. No.: 14/011,167

(22) Filed: Aug. 27, 2013

(51) Int. Cl.
| | | |
|---|---|---|
| *G06F 12/00* | (2006.01) | |
| *G11B 27/36* | (2006.01) | |
| *G06F 13/00* | (2006.01) | |
| *G06F 13/28* | (2006.01) | |
| *G11B 5/58* | (2006.01) | |
| *G11B 21/02* | (2006.01) | |
| *G06F 11/20* | (2006.01) | |
| *G11B 5/54* | (2006.01) | |
| *G06F 11/16* | (2006.01) | |
| *G06F 1/30* | (2006.01) | |
| *G06F 1/26* | (2006.01) | |
| *G11B 19/04* | (2006.01) | |
| *G06F 11/14* | (2006.01) | |

(52) U.S. Cl.
CPC .............. *G11B 27/36* (2013.01); *G06F 1/26* (2013.01); *G06F 1/30* (2013.01); *G06F 11/1441* (2013.01); *G06F 11/167* (2013.01); *G06F 11/2015* (2013.01); *G11B 5/54* (2013.01); *G11B 5/58* (2013.01); *G11B 19/047* (2013.01); *G11B 21/02* (2013.01)

(58) Field of Classification Search
CPC ......... G11B 5/54; G11B 19/047; G11B 21/02; G11B 5/58; G06F 1/30; G06F 1/26; G06F 3/0619; G06F 11/1441; G06F 11/2015; G06F 11/167
See application file for complete search history.

(56) References Cited

U.S. PATENT DOCUMENTS

| | | | | |
|---|---|---|---|---|
| 5,195,100 A | * | 3/1993 | Katz | ................ G06F 11/08 714/22 |
| 5,349,481 A | * | 9/1994 | Kauffman | ............ G11B 15/026 360/53 |
| 7,095,579 B1 | * | 8/2006 | Ryan et al. | .................. 360/75 |
| 8,370,683 B1 | * | 2/2013 | Ryan | .............. G11B 27/36 714/14 |
| 8,612,706 B1 | * | 12/2013 | Madril | ............... G06F 3/0619 711/162 |
| 8,756,382 B1 | * | 6/2014 | Carlson | ............. G06F 3/0676 711/103 |

(Continued)

FOREIGN PATENT DOCUMENTS

EP    0493984 B1    6/1997

OTHER PUBLICATIONS google.com/patents.*

*Primary Examiner* — Mark A Giardino, Jr.
(74) *Attorney, Agent, or Firm* — Holzer Patel Drennan

(57) ABSTRACT

Implementations disclosed herein provide for detecting an expected or unexpected power loss event on a storage device. Responsive to the detection of the power loss event, a plurality of potentially affected data blocks are identified and/or marked, such as by a processor, to indicate that data stored therein is potentially corrupted.

17 Claims, 5 Drawing Sheets

(56) References Cited

U.S. PATENT DOCUMENTS

| | | | |
|---|---|---|---|
| 8,959,281 B1* | 2/2015 | Malina et al. | 711/103 |
| 2002/0141097 A1* | 10/2002 | Kisaka | G11B 5/5526 360/73.03 |
| 2009/0019194 A1* | 1/2009 | Toyama | G06F 3/061 710/52 |
| 2010/0107016 A1 | 4/2010 | Colman et al. | |
| 2010/0169543 A1* | 7/2010 | Edgington et al. | 711/103 |
| 2012/0030510 A1* | 2/2012 | Hong | G11B 19/047 714/14 |
| 2012/0162806 A1* | 6/2012 | Champion | G11B 5/5582 360/53 |
| 2015/0046747 A1* | 2/2015 | Gaertner | G06F 11/1666 714/6.11 |

\* cited by examiner

POWER LOSS DATA BLOCK MARKING

SUMMARY

Implementations described and claimed herein provide techniques for marking or identifying data blocks affected by a power loss event.

In one implementation, the disclosed technology provides for detecting a power loss event on a storage device and marking a plurality of data blocks affected by the power loss event. In another implementation, a power loss logging module is configured to mark a plurality of data blocks potentially affected by an unexpected power loss event. In yet another implementation, a processor identifies a plurality of data blocks affected by a power loss event of a storage device responsive to a detected power restoration event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Data storage devices can experience power loss events that create problems with data integrity. Intelligent managing of those power loss events can increase the reliability of storage devices when in use.

Some types of data storage devices, like shingled magnetic recording (SMR) devices, have increased sensitivity to power loss events. SMR is a recording technique that allows for increased cell density, but in some implementations entails re-writing an entire band of shingled data (e.g., multiple data tracks) when one or more data cells within the band are changed. If an unexpected (or even in some cases an expected) power loss occurs during a data band re-write, data in one or more data cells within the band may be corrupted. In such case, relatively lengthy data recovery processes may later commence when a host device or a recording device tries to access the corrupted data cells.

Figure 1:
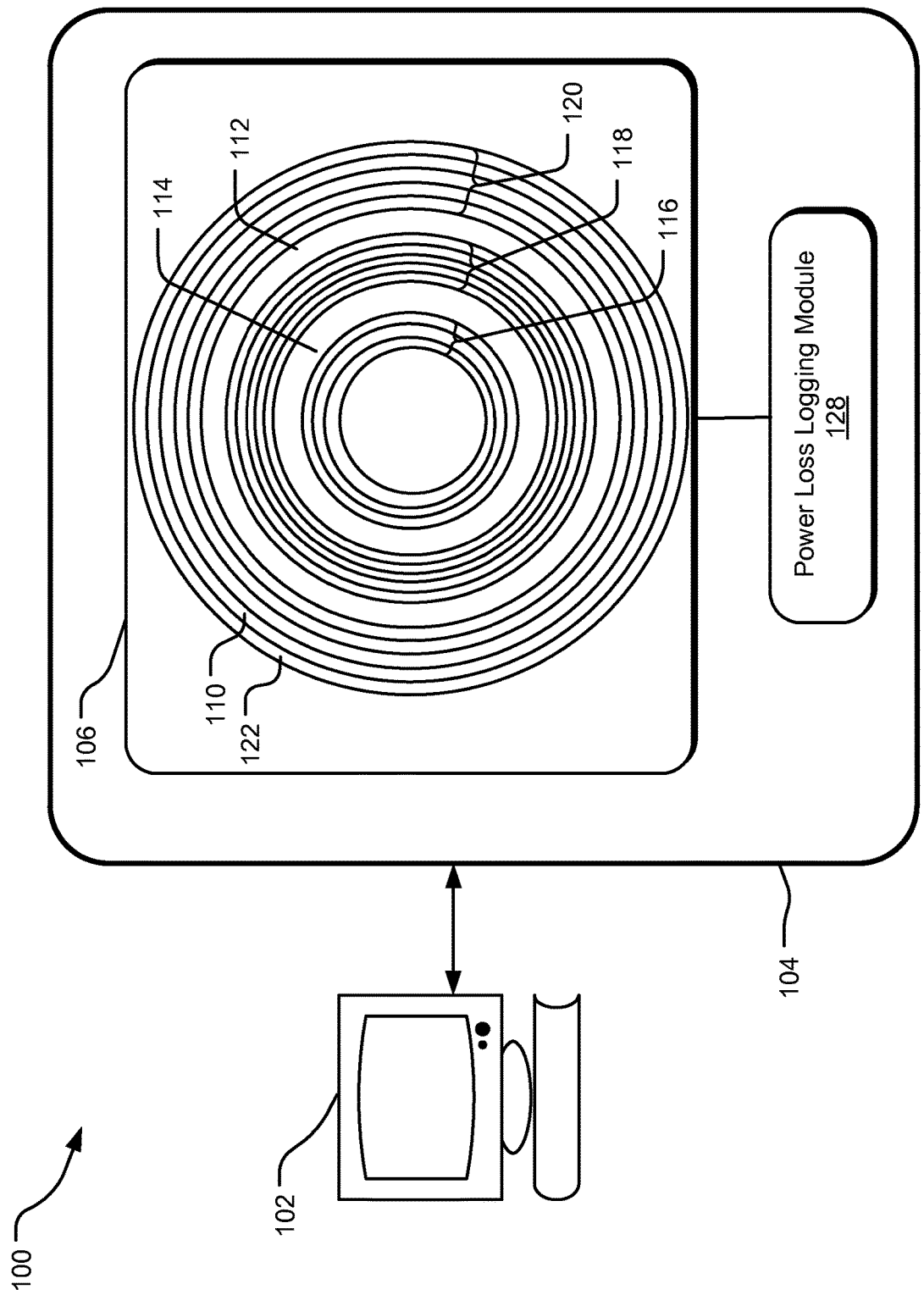
FIG. 1 illustrates an example recording system for marking data blocks affected by a power loss.

FIG. 1 illustrates a recording system 100 for marking or identifying data blocks affected by an power loss (in some implementations, an unexpected power loss). The recording system 100 includes a host computer 102 that sends one or more access commands (e.g., read or write commands) to a storage device 104. In some implementations, the storage device 104 is a SMR device; however, the storage device 104 may, in other implementations, be any device having a tangible computer-readable storage media (i.e., a storage medium 106). In the implementation of FIG. 1, the storage medium 106 is a shingled magnetic disk drive. However, in various implementations, the storage medium 106 may be one or more of a variety of tangible computer-readable media, including without limitation magnetic storage disks, solid state drives, flash memory optical storage disks, random access memories (RAMs) read only memories (ROMS), an the like.

The storage medium 106 has a number of concentric data tracks (e.g., a data track 110). Each of the concentric data tracks includes plurality of data regions or cells on which data can be stored. Isolation regions (e.g., isolation regions 112 and 114) separate groupings of adjacent data tracks, referred to as "data bands" (e.g., data bands 116, 118, and 120). Data may be stored within each of the data bands.

In the recording system 100, data can be written to data cells on the disk 106 using a write pole on a head (not shown). In some implementations, such as where the recording device 106 is an SMR recording device, the write pole may generate a magnetic field strong enough to affect two adjacent data tracks at one time. Consequently, a write operation directed at a data track 122 can incidentally affect or corrupt data on an adjacent data track 110. Therefore, in order to change any data cell within a data band (e.g., the data band 120), all of the other data in the data band is re-written to the data band in a selected sequential write order. The isolation regions (e.g., the isolation regions 112 and 114) separate the data bands from one another to prevent overwrite between adjacent data bands.

In one type of write operation, data in a data band is modified. In this type of write operation, data stored in the data band 116 is read by the storage device 104 and copied into non-volatile memory such as a temporary cache (not shown). Thereafter, the data band 116 is re-written with modified data within one or more changed data cells. The back-up copy of the data band (stored in the non-volatile memory) mitigates or eliminates the risk of data corruption in the event of power loss; however, creating the copy of the data band is time consuming and, in some cases, an inefficient use of power.

In another type of write operation, all data in a data band is overwritten with new data. In this type of write operation, the recording system 100 elects not to create a backup copy of the data band 120 in non-volatile memory because the old data in the data band 120 is going to be completely overwritten (and presumptively, the old data is no longer needed). Forgoing creation of the back-up copy saves time and reduces power consumption; however, forgoing creation of the backup copy also increases the risk of data corruption due to an unexpected power loss.

As used herein, an unexpected power loss is a power loss that occurs in a non-routine manner. When an unexpected power loss occurs, the storage device 104 may not execute usual shut-down procedures that ensure data integrity. An unexpected power loss may occur, for example, when a user pulls a power plug, when battery life of the storage device 104 expires, or when a connection between the host computer 102 or a power supply and the storage device is suddenly severed or altered.

In the above-described "data-band overwrite" type of write operation, the risk of data loss due to unexpected power loss increases as a result of the nature of shingled magnetic recording. In one example implementation, the host computer 102 sends a command to write all new data to the data band 120. In response, the storage device 104 begins writing the new data to the data band 120, starting with the outermost data track 122. While the storage device 104 is writing to the data track 122, the large write field of the writer incidentally corrupts some data cells on the adjacent data track 110. These corrupted data cells can normally be corrected on a subsequent pass (e.g., a pass that writes data to the data track 110); however, an unexpected power loss during the write to the data track 122 can leave the corrupted data cells on the data track 110 uncorrected when the power is restored.

When data is restored to the storage device 104 after the power loss, the host computer 102 may or may not re-initiate the write operation. If the write operation is not resumed, the corrupted data cells may trigger an error recovery mode at a later point in time, such as when the storage device 104 tries to read data from the corrupted data cells. At such time, the storage device 104 may attempt a number of iterative error recovery processes to restore the data on the corrupted data cells. However, some error recovery processes are prone to timeouts and/or are unsuccessful when corrupted data exists on multiple sequential cells (as observed in the above-described SMR unexpected power loss situation).

The presently disclosed technology enables identification and marking of data blocks affected by an unexpected power loss. In particular, the recording system 100 includes a power loss logging module 128 that utilizes a spare power reservoir (e.g., a capacitor or back EMF (electromotive force)) to record the position of the head when the recording system 100 loses power. When power is restored to the storage device 104, the power loss logging module 128 can use the recorded head position and a known structure of the storage device 104 (e.g., span of the write field, layout of data blocks) to identify which data blocks are likely affected by the power loss. This identification and marking allows the storage device 104 to later identify the cause of corrupted data (e.g., when the storage device 104 tries to read the corrupted data), and also permits the storage device 104 to elect a specialized error recovery process to execute on the corrupted data blocks.

For example, when power is unexpectedly lost to the storage device 104, the power loss logging module 128 may use a reserve power supply to record the logical block address (LBA) where data was being written at the time of the power loss. When the storage device 104 powers back up, the storage device may use this recorded LBA to identify other LBAs potentially affected by the power loss.

Although the data block marking techniques disclosed herein are illustrated primarily with respect to shingled magnetic recording systems, such techniques may also be utilized in other types of recording systems, including those with other types of computer-readable media that are vulnerable to power-loss related data corruption.

Figure 2:
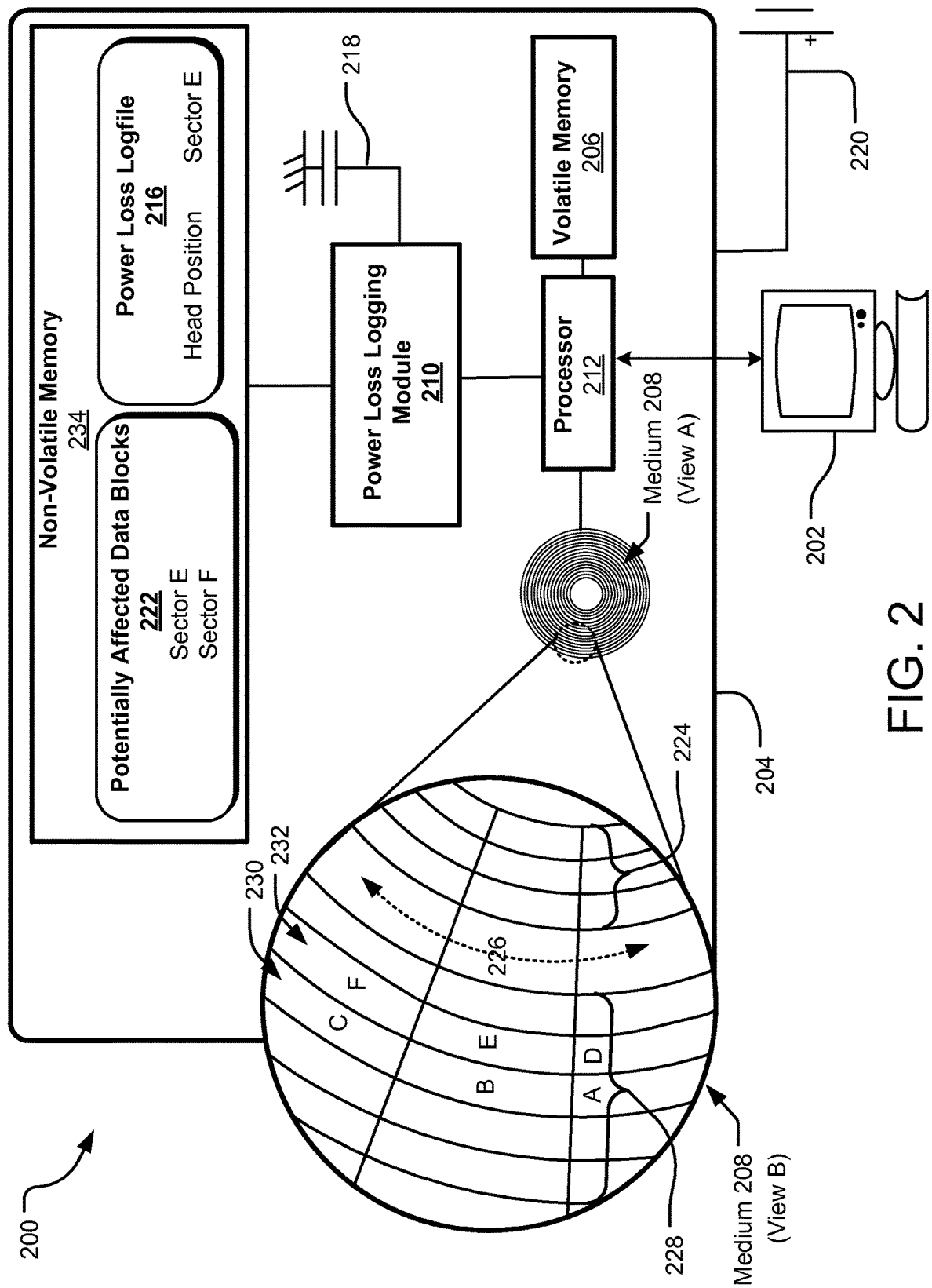
FIG. 2 illustrates another example recording system for marking data blocks affected by an unexpected power loss.

FIG. 2 illustrates another recording system 200 for marking data blocks potentially affected by an unexpected power loss. The recording system 200 includes a host computer 202 communicatively coupled to a storage device 204. The storage device 204 includes a shingled magnetic recording (SMR) storage medium 208 (i.e., the "medium 208"), a processor 212, volatile memory 206 (e.g., DRAM), and non-volatile solid state memory 234 (e.g., flash memory, read-only memories (RAMs), ferroelectric RAM (F-RAM), optical storage disk(s), etc.). In at least one implementation, the non-volatile memory 234 is a storage region on the storage medium 208.

Expanded View B illustrates a portion of the medium 208 including a number of data bands (e.g., data bands 224 and 228). Each data band includes a number of concentric data tracks (e.g., data tracks 230 and 232) which are used to store data. The data tracks are each further divided into data blocks (e.g., sectors A, B, C, D, etc.), including a number of individual data cells (not shown). Each data block corresponds to a logical memory location (e.g., a logical block address (LBA)) of the storage device 204. In addition to data bands, the medium 208 also includes a number of isolation regions (e.g., an isolation region 226), where no data is stored.

In an example write operation, the host computer 202 transmits a write command to the storage device 204 to write new data to the data band 228. The new data is temporarily stored in the volatile memory 206 (e.g., a volatile data buffer), and a write pole on a head (not shown) of the storage device 204 begins writing the new data to the data band 228. The write field of the write pole is large enough to affect two adjacent data tracks on each pass. Therefore, when the head writes to data blocks on one data track, some data blocks on an adjacent data track become corrupted. For example, when the head writes consecutively to sectors A, B, and C on the data track 230, some data cells in sectors D, E, and F, on the adjacent data track 232 may become corrupted. These corrupted data cells can be corrected on a subsequent pass of the head, when data is written to the adjacent data track 232.

If the write operation to the data band 228 completes successfully, the processor 212 sends a confirmation to the host computer 202 and deletes the new data from the volatile memory 206. However, if an unexpected power loss occurs before completion of the write operation to the data band 228, some data in the data band 228 may remain corrupted when power is restored to the storage device 204. For example, the head may write data to the data track 230, as described above. During this write, some data on the data track 232 (e.g., in sectors D, E, and F) is corrupted. The head may next begin to write to data track 232, starting with sector D. The head overwrites and corrects all corrupted data cells in sector D. However, before the head can overwrite all corrupted data cells in sectors E and F, power is unexpectedly lost. Some data cells in sectors E and F remain corrupted after power is restored to the recording system 200.

To assist in subsequent error recovery processes, a power loss logging module 210 uses an emergency power reserve 218 to record certain information at the time of the unexpected power loss. The power loss logging module 210 may be, for example, one or more modules included in firmware or software, such as a functional module of firmware embodied within the storage device 204, or software of the host computer 202. The power loss logging module 210 may be executed, for example, by the processor 212, by a processor of the host computer 202, or by another processor communicatively coupled to the storage device 204.

In FIG. 2, the emergency power reserve 218 is a capacitor in a hardware circuit of the storage device 204. However, the emergency power reserve 218 is, in other implementations, a back-up battery, a back EMF (electromotive force) of a motor of the storage device 204, or other form of reserve power supply.

When the power loss logging module 210 detects the unexpected power loss, it uses power from the emergency power reserve 218 to record head position information in the non-volatile memory 234. The power loss logging module 210 may detect an unexpected power loss when, for example, a monitored voltage (e.g., a voltage of a primary power source 220) drops below a predetermined threshold or when the monitored voltage drops and the storage device 204 does not first receive an expected "shut-down" command. More generally, an unexpected power loss may occur anytime power to the storage device 204 drops below the lower end of the VCC threshold.

In FIG. 2, the head position information is recorded in a power loss logfile 216 (an example data record) of the non-volatile memory 234. As used herein, the term "data record" refers to a record (e.g., table, logfile, etc.) that may be saved on the storage device 204 or a storage medium communicatively coupled to the storage device 204. Information written to the power loss logfile 216 may, in various implementations, include the data block being written to at the time of the power loss (e.g., sector E), a logical memory location (e.g., LBA) associated with the data block being written to at the time of the power loss, or other identifying information from which a position of the head can later be determined.

When power is restored to the storage device 204, the power loss logging module 210 is called upon (e.g., by a start-up module) to determine whether the power loss was an unexpected power loss. In one implementation, the power loss logging module 210 determines that the power loss was unexpected by querying the power loss logfile 216 and identifying a new data entry indicating a head position (e.g., "sector E"). In another implementation, the power loss logging module 210 determines that the power loss was unexpected by identifying a flag set by the power loss logging module 210 before or during the power loss. In yet another implementation, the power loss logging module 210 determines that the power loss was unexpected when a command is received from the host computer 202 which indicates that the host computer 202 failed to receive successful confirmation of completion of the previous write command.

If the power loss logging module 210 determines that the recent power loss was unexpected, the power loss logging module 210 attempts to identify which data blocks were potentially affected by the power loss. A data block is "potentially affected" by a power loss if data stored on the data block is likely to be corrupted due to reduced power available to the storage device 204 or likely to be corrupted as a result of the failed execution of one or more operations halted by the power loss. For example, a data block is potentially affected by a power loss if data within the block is corrupted by the head (or write head) of the SMR system and that data is left uncorrected at the time of an unexpected power loss.

The power loss logging module 210 determines which data blocks are potentially affected by the power loss by using the head position information in the power loss logfile 216 and known structure of recording system 200 (e.g., span of the write field, layout of data blocks, etc.). In a recording system that is not an SMR system, the power loss logging module 210 may use additional system parameters to identify data blocks potentially affected by an unexpected power loss.

In the example of FIG. 2, the power loss logging module 210 identifies sectors E and F as potentially affected data blocks, and "marks" these data blocks by creating or updating another data record (e.g., a record of potentially affected data blocks 222) to include information identifying the potentially affected data blocks. The record of potentially affected data blocks 222 (hereinafter "the record 222") includes a listing of the sectors potentially corrupted at the time of the power loss. In other implementations, the record 222 includes logical block addresses (LBAs) associated with the data stored in the potentially affected data blocks or other information useful in identifying the potentially-affected data blocks.

When the storage device 204 receives (e.g., at a later time) a command to read data from the data band 228, error correction coding (ECC) embedded in sectors E and F (the potentially affected data blocks) may indicate that the sectors E and F include corrupted data. The power loss logging module 210 (or other module of the storage device 204) queries the record 222 to determine whether the sectors E and F may have been affected by a prior power loss. Because the sectors E and F are marked sectors (e.g., sectors previously marked in the record 222), the storage device can elect to perform a "specialized error recovery process"—an error recovery process uniquely tailored to a known cause of data corruption. In some situations, specialized recovery processes can be more conducive to successful data recovery than generalized error recovery processes.

Figure 3:
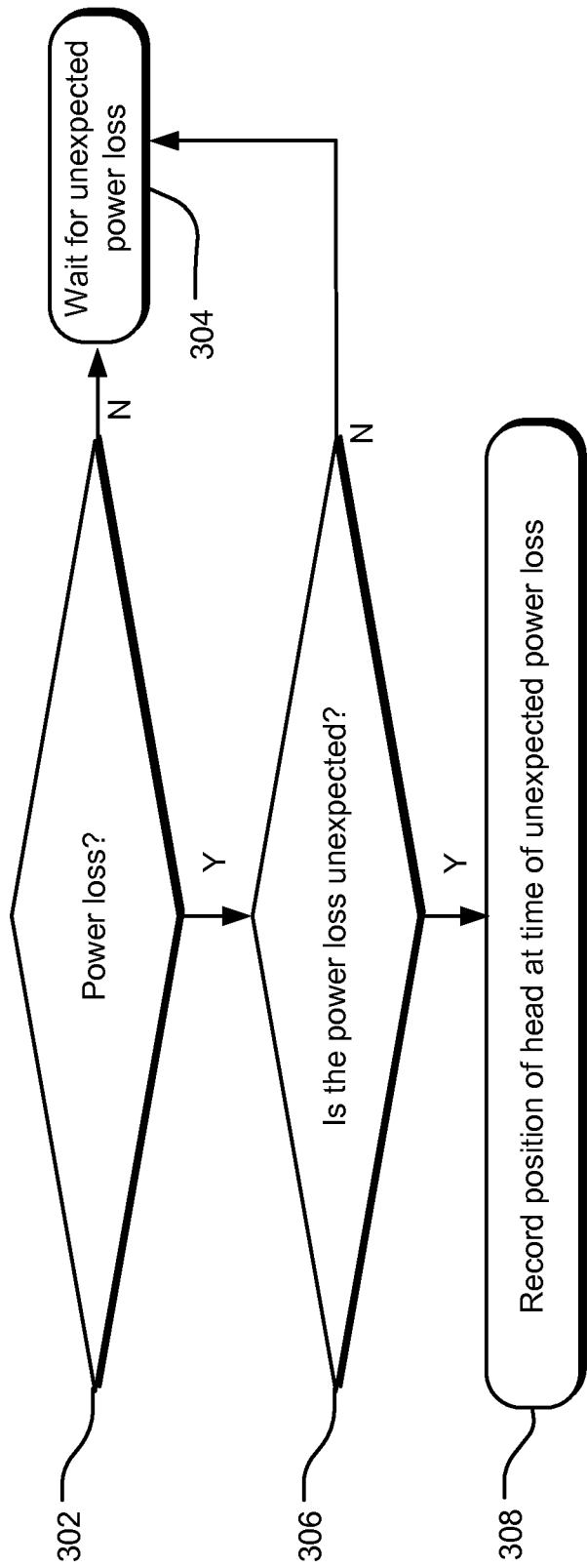
FIG. 3 illustrates example operations for a recording head position information at the time of an unexpected power loss.

FIG. 3 illustrates example operations for recording head position information at the time of an unexpected power loss. A first determination operation 302 determines whether a storage device has experienced a power loss associated with a primary power source. In one implementation, the first determination operation 302 determines there has been a power loss when a monitored voltage associated with the primary power source drops below a predetermined threshold. This voltage drop may be the result of, for example, a user pulling a power plug of the storage device, expiration of a battery power, or unexpected severance of a connection between a host device and the storage device.

If the first determination operation 302 determines that a power loss has not occurred, then a waiting operation 304 waits for an event indicating that a power loss has occurred. If, on the other hand, the determination operation 302 determines that a power loss has occurred, then a second determination operation 306 determines whether the power loss was unexpected. In one implementation, the determination operation 306 determines that the power loss was unexpected if the power was shut-off in a non-routine manner (e.g., certain procedures routinely executed to ensure data integrity did not fully execute).

If the second determination operation 306 determines that the power loss was an expected power loss, the waiting operation 304 waits for another event indicating that a power loss has occurred. If, however, the second determination operation 306 determines that the power loss was unexpected, then a recording operation 308 utilizes an emergency power reserve, such as a capacitor, back-up battery, or back EMF, to record head position information (e.g., a read/write head) of the storage device the time of the unexpected power loss. For example, the recording operation 308 may record (e.g., in a data record of the storage device) a logical block addresses (LBA) of data being written at the time of the unexpected power loss, the sector number of a sector being written to at the time of the unexpected power loss, or other head position indicator information. In one implementation, the recording operation sets a flag that indicates the power loss was unexpected. In another implementation, the existence of a recorded head position serves as indication that the power loss was unexpected.

Figure 4:
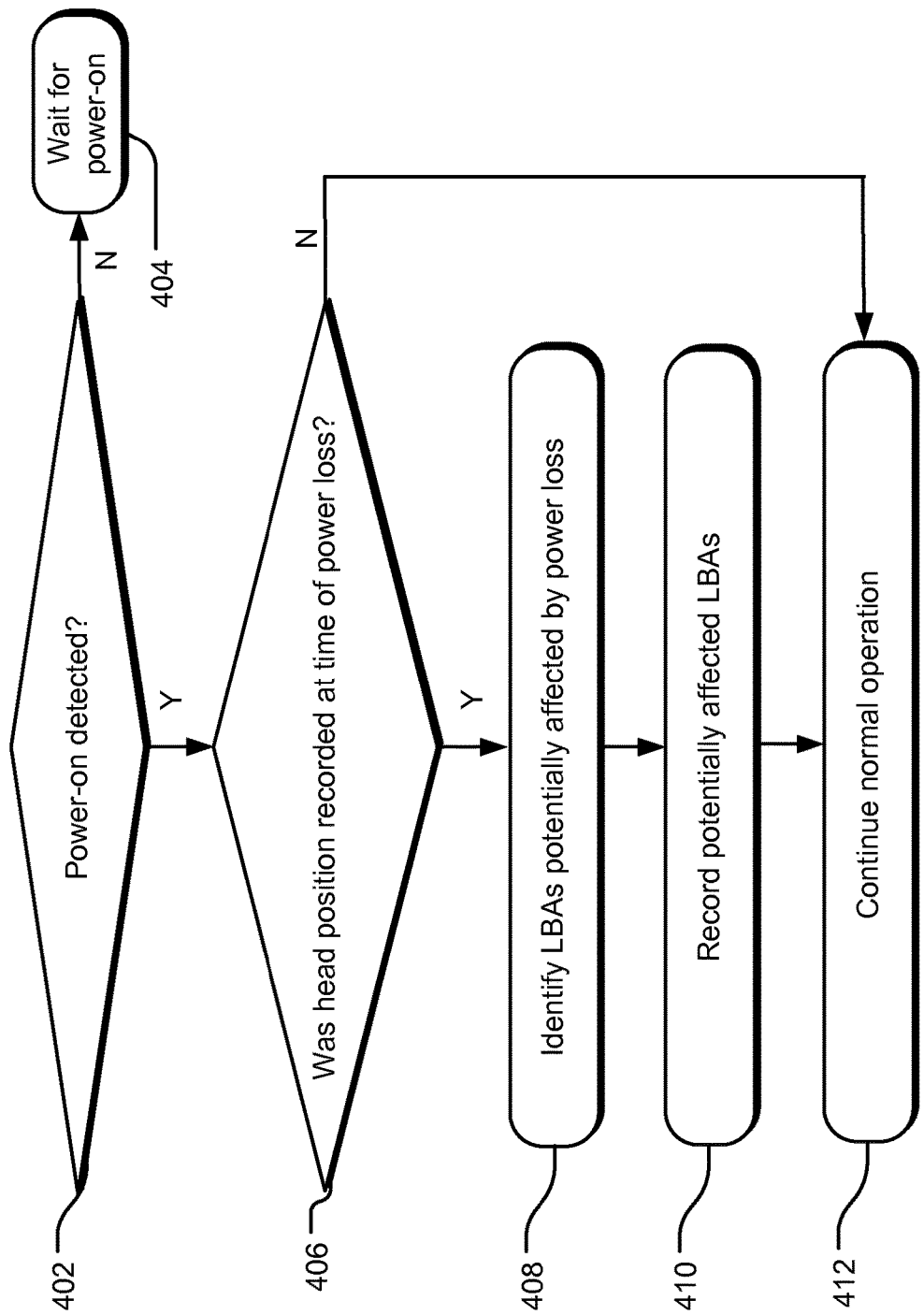
FIG. 4 illustrates example operations for marking data blocks affected by an unexpected power loss.

FIG. 4 illustrates example operations for marking data blocks affected by an unexpected power loss. A first determination operation 402 determines whether power has recently (e.g., within the past few minutes) been restored to a storage device. For example, the first determination operation 402 may determine that power has been recently restored to the device by identifying one or more received commands related to initiation of the storage device. If the first determination operation 402 does not determine that power was recently restored, a waiting operation 404 waits until the next power-on of the storage device.

If, however, the first determination operation 402 determines that power has been recently restored to the storage device, a second determination operation 406 determines (e.g., by querying one or more data records) whether head position information was recorded prior to the power loss. If the second determination operation 406 determines that the head position was recorded, an identification operation 408 uses the head position information and known structure of recording system (e.g., span of the write field, layout of data blocks, etc.) to identify a range of logical block addresses (LBAs) and/or corresponding sectors on the storage device potentially affected by the power loss. A recording operation 410 records the potentially affected LBAs and/or corresponding sectors in one or more data records accessible by the storage device. After the recording operation 410, the storage device enters a normal operation mode 412.

Figure 5:
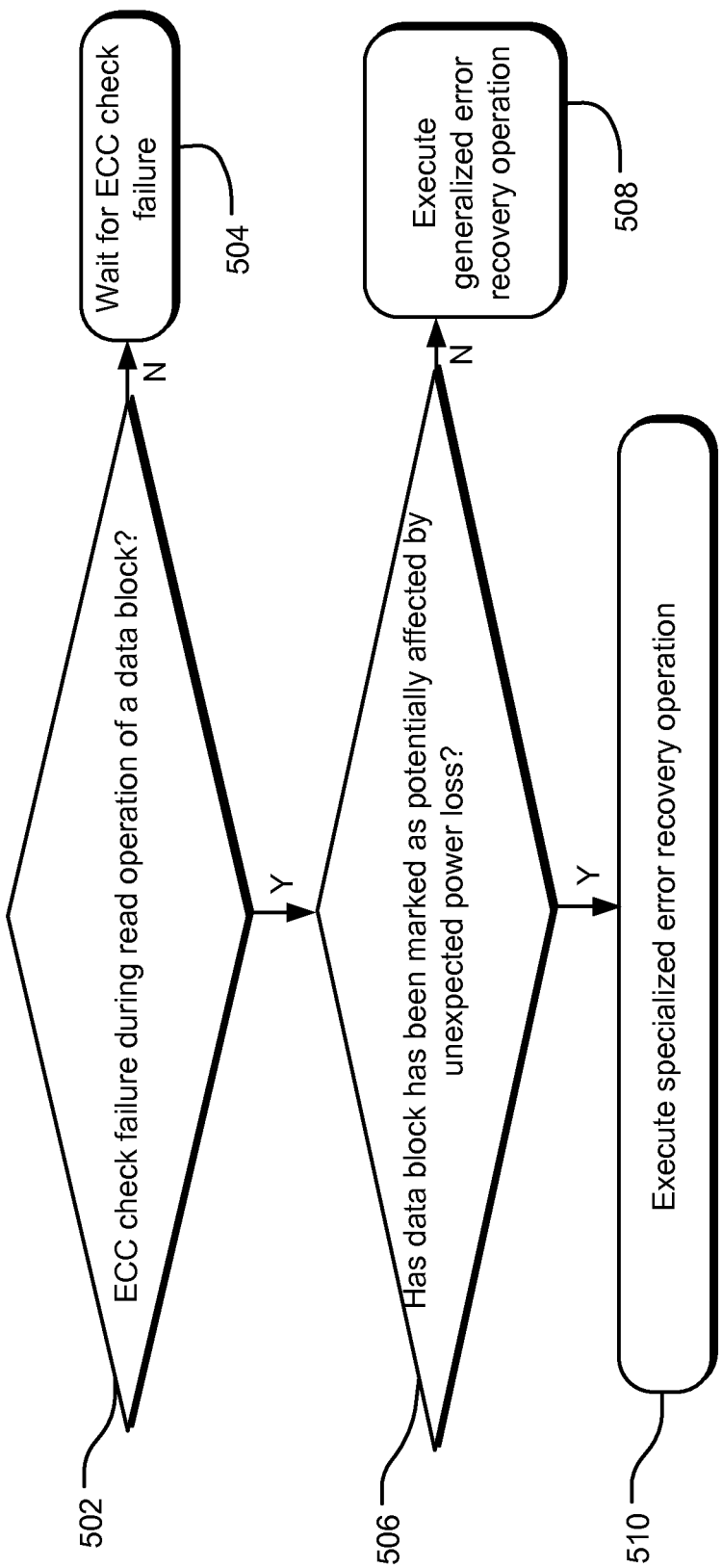
FIG. 5 illustrates example operations for executing specialized error recovery on a marked data block during a read operation.

FIG. 5 illustrates example operations for executing specialized error recovery on a marked data block during a read operation. A first determination 502 determines whether an error correction code (ECC) check has failed during a read operation of a data block on a storage medium. If an ECC check failure has not occurred, a waiting operation 504 waits until an ECC check failure occurs. If the determination operation 502 determines that the ECC check failure has occurred, another determination operation 506 determines whether the data block has been marked as one that is potentially affected by an unexpected power loss. In one implementation, the determination operation 506 accesses one or more logfiles of the device to determine whether the data block or associated LBA has been marked as potentially affected by a prior, unexpected power loss.

If the determination operation 506 determines that the data block has not been marked, then an execution operation 508 executes a generalized error recovery process on the data block. The generalized error recover process may include, for example, a number of calculative iterations that execute regardless of the original reason for the corruption. If, however, the determination operation 506 determines that the data block has been marked, another execution operation 510 executes a specialized data recovery process on the data block. The specialized process is a process uniquely tailored for error recovery of data corrupted due to an unexpected power loss.

In one example generalized error recovery process, a series of corrupted data blocks are identified by a storage device. The storage device initiates a lengthy generalized error recovery process on the first corrupted data block in the series. The generalized error recovery process fails to recover the data of the first corrupted data block, and the storage device begins to execute the generalized recovery process on the second corrupted block. The generalized error recovery process also fails to recover data of the second corrupted data block. Subsequently, the storage device initiates the generalized error recovery process on the third corrupted data block. While waiting for the drive operation to complete, a host computer experiences a timeout.

An example specialized error recovery process may differ from the above-described generalized error recovery process in that the specialized error recovery process does not attempt to recover the data from every corrupted data block in the series after recovery efforts fail on the first one or two data blocks. Rather, the specialized recovery process determines that such data is not recoverable and quickly reports back to the host computer. In this situation, the host computer does not timeout. In other implementations, specialized error recovery processes may be more likely to successfully recover data than generalized error recovery processes.

The implementations of the technology described herein are can be implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the disclosed technology. Since many implementations can be made without departing from the spirit and scope of the invention, the invention resides in the claims hereinafter appended.

What is claimed is:

1. A method comprising:
    detecting a power loss event on a storage device at a time when a first data track is being written with data that is not backed-up in non-volatile memory;
    responsive to the detection of the power loss event, recording a position of a head of the storage device at the time of the power loss;
    responsive to a power restoration event, identifying one or more data blocks potentially corrupted by the power loss event based on the recorded position of the head;
    select a specialized error recovery process from multiple available error recovery processes to recover data from the data blocks identified as potentially corrupted due to the power loss event; and
    initiating the specialized error recovery process on one or more of the marked plurality of data blocks.

2. The method of claim 1, wherein the marking operation is responsive to a detected power restoration event.

3. The method of claim 1, wherein recording the position of the head further comprises:
    recording the position of the head in a non-volatile solid state memory.

4. The method of claim 1, wherein the marking operation further comprises: identifying the plurality of data blocks potentially affected by the power loss event based on a recorded position of a head; and
    updating a record of the storage device to include an identifier, including a logical block address, associated with each of the identified data blocks.

5. The method of claim 1, wherein the storage device is a shingled magnetic recording (SMR) device.

6. The method of claim 1, wherein the marking operation further comprises:
    updating a record of the storage device to include a logical memory location associated with each of the plurality of data blocks.

7. The method of claim 1, wherein the recording operation further comprises:
    recording the location of the head using a reserve power supply.

8. A system comprising:
memory;
a processor; and
a power loss logging module stored in the memory and executable by the processor to:
    detect an unexpected power loss event at a time when a first data track is being written with data that is not backed-up in non-volatile memory;
    responsive to and after the detection, record a position of a write head of a storage device; and
    responsive to a power restoration event, use the recorded position of the write head to identify one or more sectors that are potentially corrupted by the power loss event;
    select a specialized error recovery process from multiple available error recovery processes to recover data from the one or more sectors identified as potentially corrupted due to the power loss event; and
    initiate the selected specialized error recovery process on one or more of the identified sectors.

9. The system of claim 8, wherein the power loss logging module marks the one or more sectors responsive to a detected power restoration event.

10. The system of claim 8, wherein the power loss logging module is further executable to:
    identify the identified sectors based on a recorded position of a write head; and update a record of a storage device to include an identifier associated with each of the identified sectors.

11. The system of claim 8, wherein the power loss logging module is further executable to:
    update a record of a storage device to include a logical memory location associated with each of the identified sectors.

12. The method of claim 8, wherein the specialized recovery process entails:
    determining that data recovery attempt has failed with respect to a first data block of the one or more sectors identified as potentially corrupted due to the power loss event; and
    responsive to the determination, reporting back to a host that data is not recoverable from the sectors other than the sector with the first data block identified as potentially corrupted without performing a data recovery attempt on the sectors other than the first data block.

13. A method comprising:
    responsive to a detection of a power loss event, recording by a processor a position of a write head of a storage device;
    responsive to a detected power restoration event, identifying by the processor a plurality of data blocks affected by the power loss event of the storage device based on the recorded position of the write head, each of the plurality of data blocks being associated with data that is not backed-up in non-volatile memory; and
    selecting and initiating a specialized error recovery process on one or more the data blocks identified as potentially corrupted due to the power loss event based on the recorded position of the write head.

14. The method of claim 13, wherein recording the position of the write head is performed using an emergency power reserve separate from a primary power source of a storage device.

15. The method of claim 14, wherein the identifying operation further comprises:
    recording the position of the write head in a non-volatile flash memory.

16. The method of claim 13, wherein the identifying operation further comprises:
    identifying the plurality of data blocks potentially affected by the power loss event based on a recorded position of a write head; and
    updating a record of the storage device to include an identifier associated with each of the identified data blocks.

17. The method of claim 14, wherein the recording operation further comprises:
    recording the location of the write head using a reserve power supply.

* * * * *